Jan. 26, 1965   S. P. SPENCE ETAL   3,167,395
RESONATING PULSE REACTOR
Filed Aug. 26, 1958   3 Sheets-Sheet 2

INVENTORS:
Sydney P. Spence, Walter R. Marshall,
BY and Harvey W. Steen,
Walter C. Kehm
Attorney

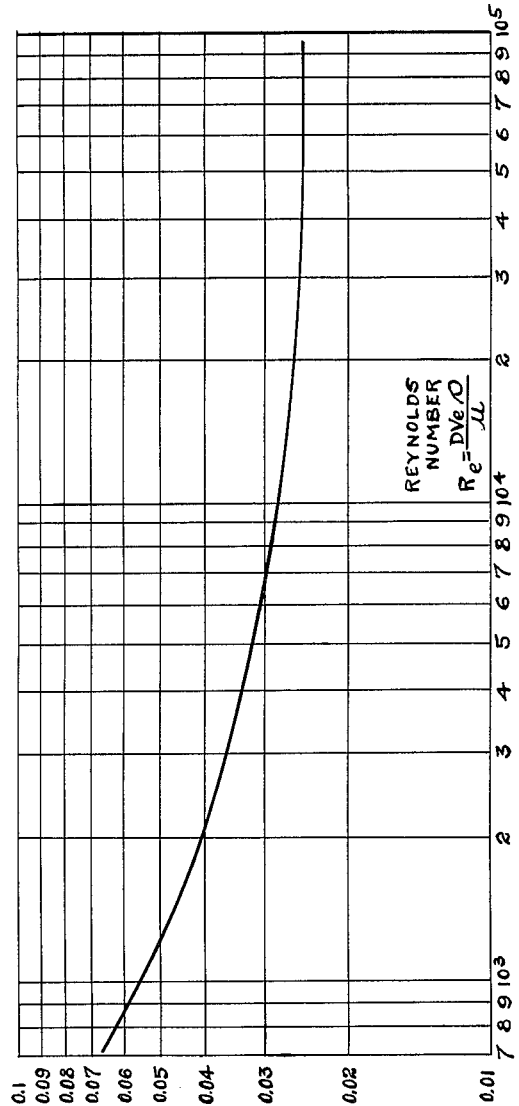
Fig. 3 FRICTION FACTOR VS REYNOLDS NUMBER 3,167,395
RESONATING PULSE REACTOR
Sydney P. Spence, Caldwell, Walter R. Marshall, Bloomfield, and Harvey W. Steen, South Plainfield, N.J., assignors to Union Carbide Corporation, a corporation of New York
Filed Aug. 26, 1958, Ser. No. 757,236
6 Claims. (Cl. 23—252)

This invention relates to a continuous tubular reactor, useful for carrying out polymerization reactions requiring agitation of the reactants with slow mass transfer of the reactants through the system, and for other operations requiring agitation of mixtures passing through the reactor, without impeding progressive throughput flow thereof.

In the usual type of tube or pipe reactors, flow of the reactants at low velocities is laminar with resulting poor agitation. The agitation can be increased by increasing the flow velocity, but this, in turn, reduces the retention time and may require a length of reactor tubing which is impractical.

It has been proposed to improve the agitation by imparting a reciprocating motion to the fluids in the reactor; for example, by means of an eccentric-driven diaphragm, or a reciprocating pump directly coupled to the reactor tubes. In such systems, however, the displacement which causes the agitation is the displacement of the reciprocating device. Thus, if a reciprocating pump is used, the agitation achieved will be proportional to the displacement volume of the pump. Consequently, vigorous agitation could require pumps of such large size as to be impractical or whose operational costs would be uneconomical. Moreover, the operation of such a pulsating device in connection with a tubular reactor results in the generation of considerable amounts of kinetic energy in the flowing stream during each alternate half cycle, which energy, if not dissipated or utilized, can result in "water-hammer" with its well known destructive effects on the equipment. This has been obviated to some extent by the inclusion of baffles in the system or as accomplished in pulse columns by the use of perforated plates.

These mechanical obstructions to the flow of the reactants are impractical, particularly when incorporated into the reactors for carrying out polymerization reactions. In these reactions, the viscosity of the mass continually increases, and the viscous polymeric products tend to accumulate on any exposed surface, thereby restricting the flow of the reactants and eventually stopping it entirely.

Vigorous agitation of the reactant mass minimizes or prevents this local accumulation of polymeric particles on smooth surfaces, and it is one object of this invention to accomplish this agitation in a tubular reactor having smooth interior walls without baffles or obstructions, and in which throughput flow is progressive. This is done in our invention by providing a tubular reactor equipped with energy storage devices for imparting to the liquid contents of the reactor, an oscillatory motion at the frequency for resonance of the system, said resonance frequency being a function of the liquid reactant mass, the pipe cross sectional area, and the mechanical compliance of the energy storage devices. The oscillatory motion is sustained by an oscillatory flow generator operating at the said resonant frequency and having sufficient power to maintain the system in a condition of resonant oscillation.

It is a further object of this invention that the resonant oscillatory motion imparted to the progressing reactive mass produces turbulent flow in the reactor tubes during each half cycle of flow.

This invention has, as a further object, to maintain a continuous output of product from the reactor by the imposition of a throughput flow on the oscillatory motion of the resonating system.

One embodiment of our invention comprises a tubular reactor having energy storage devices, such as gas domes, respectively located at respective ends thereof, a pulse-generating device, such as a piston or diaphragm pump connected in a parallel relationship between the reactor tube ends, and metering pumps for feeding reactants and removing products.

Essentially then, from apparatus standpoint, this invention, in preferred embodiments thereof, comprises a tubular reactor provided by:

(1) A pipe or tube, which may be jacketed or otherwise arranged for application thereto of a heating or cooling agent as may be required consonant with a specific use thereof; said pipe or tube being of length to provide sufficient retention time for a progressively flowing liquid reaction stream moving therethrough to be subjected to desired reaction effect;

(2) Means to establish conditions for natural resonance of the liquid in the tube, as by the use of potential energy storing devices, e.g., gas domes or equivalent devices or structures, one located at or adjacent each end of the pipe or tube and in communication therewith;

(3) A pulse generating device, e.g., a piston pump, reciprocating diaphragm or equivalent means, which cooperates with the potential energy storing devices to oscillate the progressively flowing liquid reaction stream at a frequency corresponding to the resonance frequency of the system, as determined by the liquid mass, pipe or tube cross-section, and compliance of said potential energy storing devices; and (4) Metering pumps for feeding proper amounts of the liquid reaction stream into the receiving end of the pipe or tube, and for withdrawing the reacted liquid from the discharge end of said pipe or tube at such rate as to hold constant the net volume of the liquid reaction stream within the pipe or tube.

Illustrative embodiments of a resonating pulse reactor according to this invention are schematically shown in the accompanying drawings, in which:

FIG. 3 is a graph indicating the relationship between the friction factor and the Reynolds number for a treated viscous liquid passing through the tubular reactor.

In the drawings, like characters of reference are applied to indicate corresponding parts.

Figure 1:
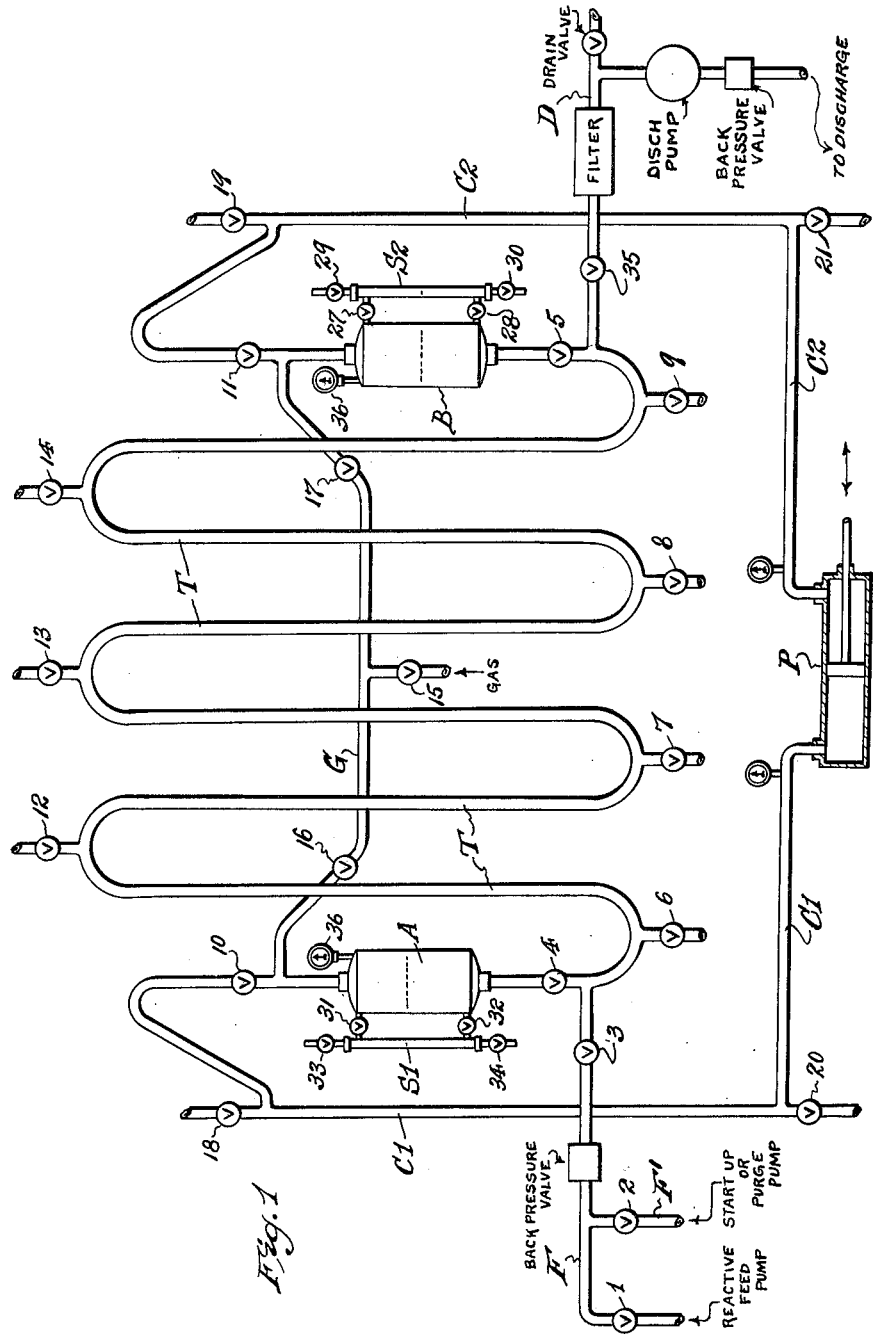
FIG. 1 is a schematic showing of one example of tubular reactor apparatus according to this invention.

Referring first to FIG. 1, the illustrative embodiment of a tubular reactor shown thereby comprises a reactor pipe or tube T, which is of such predetermined length and diameter as to assure sufficient retention time of a progressively flowing liquid reaction stream passing therethrough that will permit desired reaction of its components to be accomplished. Preferably the reactor pipe or tube T is looped back and forth upon itself to conserve occupancy space of the apparatus. The pipe or tube T may be jacketed for application thereto of a heating or cooling agent, as given use of the reactor may require, or heating or cooling of the pipe or tube T may be attained by any other suitable method or means. The reactor pipe or tube T is preferably provided, in communication with successive upper loops thereof, with vent values 12, 13, and 14, as shown, and, in communication with successive lower loops thereof, with drain valves 6, 7, 8 and 9.

A feed conduit F leads from a source of reaction or other liquid to be treated to the receiving end of the reactor pipe or tube T, and is subject to controls of included valves 1 and 3. A discharge conduit D leads from the outgoing end of the reactor pipe or tube T, and is subject to control of included valves 35.

Connected in communication with the reactor pipe or tube T, at or adjacent to one end thereof, is a potential energy storing device, illustratively shown in the form of a gas dome A, with the lower end of which the pipe or tube T communicates through a valve 4; and connected in communication with the pipe or tube T, at or adjacent to the opposite end thereof, is a like potential energy storing device, also illustratively comprising a gas dome B, with the lower end of which the pipe or tube T communicates through a valve 5. A gas delivery conduit G, leading from a source of gas supply, is adapted to deliver an inert gas (e.g., nitrogen) or air to the upper ends of the respective gas domes A and B. This gas delivery conduit G is provided with an intake valve 15, and control or shut-off valves 16 and 17 in the respective branches thereof leading to the respective gas domes A and B. The gas dome A is provided with a liquid level sight glass S1, including control valves 31 and 32, and an upper vent valve 33, and a lower drain valve 34. Similarly the gas dome B is also provided with a liquid level sight glass S2, including control valves 27 and 28, and an upper vent valve 29 and lower drain valve 30. Each gas dome A and B is also provided with a pressure indicating gage 36.

A pulse generating device is provided and is illustratively shown as a driven piston pump P without check valves. A conduit leg C1 extends from one end of the cylinder of pump P and connects it with the upper end of the gas dome A, and similarly, a conduit leg C2 extends from the opposite end of the cylinder of pump P and connects it with the upper end of the gas dome B. The conduit leg C1 includes a shut-off valve 10, and upper valve 18 and a lower valve 20. The conduit leg C2 includes a shut-off valve 11, an upper valve 19 and a lower valve 21. The pulse generating pump P and its conduit legs C1 and C2 are provided with a suitable fluid adapted to be activated by said pump. This fluid can be the gas utilized in the gas domes A and B, but preferably is a liquid which is stable under temperature somewhat lower than the temperature applied to the reactor pipe or tube T when the latter is heated, or a liquid that does not react with the reaction liquid to be treated, or that is not likely to corrode the pump or conduit legs. The pump activated liquid, as pulsated or reciprocated in the conduit legs C1 and C2 by the action of the pump piston, can rise and fall in said conduit legs within an upper limit of movement which precludes carry over of said liquid into the gas domes A and B.

Communicating with the feed conduit F is a delivery conduit F1 through which a start-up liquid can be supplied, through its included control valve 2, to the reactor pipe or tube T. This start-up liquid may be any which can be heated to the reaction temperature, at which the reactor apparatus is to operate, without generating high pressures, and which can precede the reaction liquid to be treated without risk of complicating subsequent reaction process, and which does not react by itself at reaction temperature.

To condition the tubular reactor ready for reception of and operation upon a reaction liquid stream, progressively flowing therethrough, by subjection thereof to vigorous agitation according to the method and principles of this invention, the following startup procedure is resorted to:

Assuming the reactor pipe or tube T to be empty and subjected to room temperature only, and that all service piping connected therewith to be air tight, valves 3 and 14 are opened, and valves 1, 2, 4, 5, 6, 7, 8, 9, 12, 13 and 35 are closed. The valve 2 is opened to introduce start-up liquid into the reactor pipe or tube T, whereby to fill the latter. When the start-up liquid outflows from the open valve 14, this valve is closed, and feeding in of start-up liquid is stopped by closing valve 2.

The pulse generating pump P is now prepared for operation by supplying the same, and its conduit legs C1 and C2 with a selected activating fluid through opened valves 18 and 19, which are thereafter again closed.

The potential energy storing gas domes A and B are now supplied with their quotas of gas content. To this end, valves 3, 10, 11, 16, 17, 27, 28, 31 and 32 are opened, and valves 1, 2, 4, 5, 6, 7, 8, 9, 12, 13, 14, 15, 18, 19, 20, 21, 29, 30, 33, 34 and 35 are closed. Valve 15 is opened to supply gas at approximately 50 p.s.i.g. to the gas domes A and B from a source of supply, whereupon said valve 15 is closed and valves 4 and 5 are opened. Valve 2 is now again opened to further introduce start-up liquid into the system until the gas domes A and B are each approximately half-filled therewith, as can be determined by inspection of the sight glasses S1 and S2, whereupon valve 2 is closed against further entrance of start-up liquid.

During the foregoing preparatory operations, the reactor pipe or tube T can be relieved of any contained air or gas by venting the same through successively opened valves 12, 13, and 14. In doing this watch must be maintained to assure that the desired liquid level in the gas domes A and B is retained. When the reactor pipe or tube T has been vented to assure that its liquid content is continuous and free from voids or gas pockets, the gas pressure in the gas domes A and B is raised to approximately 100 p.s.i.g. by such additional supply of gas thereto as may be required.

If the reactor pipe or tube T is to be operated under elevated temperature conditions, the same may be heated at this time to the desired temperature, and while the system warms up, the pulse generating pump P is started, and is operated at a selected frequency until the peak pressure in either gas dome reaches a desire value, the pump operation being continued until the system attains the desired operating temperature. When such operating temperature is attained, the pump P is stopped, and its piston is positioned at mid-stroke. If at this time, the liquid levels in the gas domes A and B are not equal, the levels may be adjusted to desired positions by draining liquid off through valves 30 and 34, or by admitting more liquid into the system through valve 2. Further venting of the reactor pipe or tube T may be indicated to be required. If so, the venting procedure above set forth can be repeated, and the pressure in the gas domes A and B may, if necessary, be adjusted by opening valves 16 and 17 to supply additional gas through valve 15, or by venting excess gas through valves 18, 19, 29 and 33, as conditions may require. When, however, the system can undergo about 50 to 100 p.s.i. change in pressure, with liquid levels in both gas domes A and B remaining equal and constant, the reactor is fully vented, and is ready for operation.

It will be understood that the foregoing resonant system is a mechanical analog of a parallel resonant electrical tank circuit driven by a high impedance A.C. generator. The A.C. generator must develop enough voltage, which corresponds with the pressure of the liquid in the tube T, to match or slightly exceed the peak voltages developed by the parallel combination of an inductor, such as L, and a capacitor, such as C, at resonance. However, the current flow from the generator is much smaller than the oscillatory current in the tank circuit.

In applicants' system, the inertia of the mass of liquid in the reactor tube, including that in the domes A, B, corresponds with electrical inductance while the compressibility of the gas in said domes corresponds with electrical capacitance. Moreover, in this configuration the gas volume in said domes are analogous to capacitances to ground, connected at each end of an inductance. They are, therefore, effectively in series with each other, behaving as an equivalent single capacitance of one half the value of each dome taken separately. This equivalent capacitance, together with the aforementioned equivalent inductance form a tank circuit. The pulse generator in turn is connected in parallel with these elements. It serves to add a small increment of volume to one dome just as the gas in that dome reaches its cyclic pressure maximum and at the same time subtract a small increment from the other dome which is then at a pressure minimum, each half cycle reversing its action in synchronism with the natural resonant cycling of the fluid mass. Because of this parallel resonant configuration, the cyclic component of the reactor flow is oppositely directed and is in practice substantially larger than the generator flow which triggers it, due to the familiar amplification through resonance.

OPERATING PROCEDURE

The system being at desired temperature, the pulse generating pump P being sealed by the activating liquid, the pressure in the gas domes A and B being at correct value, and the liquid levels in said gas domes being properly balanced against the gas content of said gas domes, the valving of the system is arranged or set as follows:

Valves 3, 4, 5, 10, 11, 27, 28, 31 and 32 are opened; and valves 1, 2, 6, 7, 8, 9, 12, 13, 14, 15, 16, 17, 18, 19, 20, 21, 29, 30, 33, 34, 35 are closed.

The pulse generating pump P is started. Before admitting the reaction liquid stream to the reactor pipe or tube T, the pressure swing indicated by the gauges 36 of the gas domes A and B should be observed; and steps taken to bring the maximum pressure to a peak value. To do this, the frequency of the pulse generating pump P is increased 1 to 2 c.p.m., and the pressure swings in the gas domes noted. If maximum pressure in either gas dome increases, again increase the frequency of the pulse generating pump, but if maximum pressure decreases, lower the frequency of the pulse generating pump. The frequency of the pulse generating pump is thus adjusted until a peak value for maximum pressure in the gas domes is obtained, whereupon the pulse generating pump is set to the frequency that effects such peak value. The system is now resonating.

The system resonating, valves 1 and 35 are opened, and feed and discharge pumps (not shown), which induce progressive flow of the reaction liquid stream through the reactor pipe or tube T, are started. These feed and discharge pumps should pump at the same volumetric rates. Until the time that the reaction product starts discharging, there may be some change in the density, viscosity and phase relationships in the reaction liquid content of the reactor pipe or tube T. In such case, the feed and discharge rates of the feed and discharge pumps can be adjusted to keep the liquid levels in the gas domes A and B constant. It should be determined that pressure in the system is maintained.

During operation, movement of the piston of the pulse generating pump P in one direction, e.g., to the left, moves the pump activated liquid in the conduit leg C1 toward the gas dome A, and exerts pressure upon the gas content of the latter, which is applied to its liquid content, thus driving some of the reaction liquid out of said gas dome A and through the reactor pipe or tube T toward and into the opposite gas dome B. Movement of the piston of the pulse generating pump P in the opposite direction, e.g., to the right, moves the pump activated liquid in the conduit leg C2 toward the gas dome B, whereby the gas content of said gas dome B is compressed, thus reversing the operation, whereby to drive some of the reaction liquid out of said gas dome B, and through the reactor pipe or tube T, in opposite direction, toward and back into gas dome A. In this manner, a back and forth cyclic movement of oscillation of the reaction liquid stream in the reactor pipe or tube T occurs along the axis of said stream. This oscillating movement is thus imposed upon the progressive flow movement of the reaction liquid stream through the reactor pipe or tube. Such oscillatory movement of the reaction liquid stream induces vigorous turbulence thereof which facilitates the reaction effects to which the stream is desired to be subjected during its progressive flow through the reactor pipe or tube T.

The use of gas domes A and B, which are energy storing devices, increases the efficiency and economy of power utilization over that required for a reciprocating device, such as a pump or equivalent device, used alone. When used alone in connection with a hydraulically filled system, the kinetic energy developed by the pump or equivalent device and transmitted to the liquid in the system is abruptly stopped at the end of an operative stroke of the device. By using the gas domes, such kinetic energy is stored in the gas domes by compression of the gas stored therein, so that such stored energy is available to aid in reversing liquid flow in the system without interrupting or interfering with progressive throughput flow of said liquid.

In the reactor according to this invention, when the same is operating at equilibrium, the liquid reactant mass is set in motion through the creation of a differential pressure between the ends of the reactor. This differential pressure is produced initially by the pulse generating device, which compresses the gas in one gas dome as it simultaneously expands the gas in the other. The liquid mass accelerates in the direction of the low pressure dome, reaching a maximum velocity as the dome pressures equalize, and then decelerating to a stop as inertia carries the stream further causing compression of the gas in the second dome and expansion of the gas in the first dome. The development of this reversed pressure gradient is simultaneously augmented by the action of the pulse generator which further compresses the gas in the second dome and expands it in the first dome, thus adding energy to replace energy dissipated in flow. The above process then operates in reverse, completing the first cycle of oscillation. This cyclic reversal of flow occurs at the natural resonant frequency of the system and the pulse generator is operated at this frequency. The natural resonant frequency in terms of system parameters known before experimentation can be estimated by the following formula:

$$f_0 = 60 \sqrt{\frac{gPD^2}{8\Pi\rho VN} - \left(\frac{8\mu}{\Pi D^2 \rho}\right)^2}$$

$f_0$ = natural resonant frequency, cycles per minute.
$g$ = gravitational constant = 32.2 ft./sec.$^2$ for English engineering units.
$P$ = static pressure in reactor, lbs./sq. ft., absolute.
$D$ = internal diameter for reactor pipe, ft.
$\Pi$ = 3.14159.
$\rho$ = liquid density (reaction mass), lbs./cu. ft.
$V$ = mean gas volume, each gas dome (assumed to be equal), cu. ft.
$N$ = reactor length, ft.
$\mu$ = liquid viscosity (reaction mass), lbs./ft. sec.

The agreement between actual resonant frequencies and calculated values is within the accuracy of the experimental measurements. This is shown in the following table.

| Actual Resonant Frequency, c.p.m. | Calculated Resonant Frequency, c.p.m. |
|---|---|
| 21.7 | 22.2 |
| 25.5 | 25.2 |
| 27.5 | 27.2 |
| 30.3 | 29.3 |
| 32.1 | 31.3 |
| 33.3 | 33.3 |

The peak velocity, which occurs once during each half cycle, is made to exceed the requirements for turbulent flow, as given by the well known Reynolds number criterion, by providing sufficient driving power to just match the energy dissipation rate through fluid friction and turbulence.

In standard flow in straight tubes—unidirectional flow—it is generally stated that turbulence occurs between a Reynolds number of 2100-4000 for flow in straight sections of round pipe. However, in the system of our invention with its cyclic reversal of direction of flow and the alternating varying velocities that result at resonance, it was found that turbulence occurs at Reynolds numbers as low as 700–800. (Determined for $Ve$=root mean square velocity.)

Since the Reyolds number defines the probable threshold of turbulent flow for any given liquid mixture to be agitated and reacted in a reactor designed according to our invention, the Reynolds number should exceed 700 at the resonating velocity in order to produce turbulent flow. This velocity can be estimated from the following formula:

$$Ve = \frac{\mu Re}{D}$$

where, $Ve$=root mean square velocity, ft./sec.
$Re$=Reynolds number.
$D$=inside diameter of pipe, ft.
$\rho$=liquid density, lbs./cu. ft.
$\mu$=liquid viscosity, lbs./ft./sec.

Having determined the velocity required to produce tubulence, the pulse generator necessary displacement is set to produce this velocity which can either be measured directly, or calculated from the peak differential pressure across the domes. The peak pressure differential can be calculated as follows. For the Reynolds number used in determining the velocity, the friction factor is obtained from the graph FIG. 3. This quantity and the root mean square velocity as already determined are substituted in the following formula:

$$P = \frac{2.83 \rho f L V e^2}{gD}$$

where $P$=peak differential pressure across domes, lbs./sq. ft.
$f$=friction factor.
$\rho$=liquid density lbs./cu. ft.
$L$=effective length of reactor tubes, ft.
$Ve$=root mean square velocity ft./sec.
$g$=constant 32.2/sec.
$D$=inside diameter of pipe, feet.

For a considerable number of mixtures having viscosities ranging from 26.7 to 1.4 cp. and agitated in a particular reactant system, the flow rates resulting from resonation and which produced turbulence varied between 1.73 and 5.5 ft. per sec. Under these conditions, the Reynolds number varied from 850 to 46,600. The resonant frequency varied between 21.8 and 37.5 cycles per minute.

The operating data on these mixtures are given in the following table:

*Table I*

OPERATING CONDITIONS IN RESONATING SYSTEMS

|  | Ex. 1 | Ex. 2 | Ex. 3 | Ex. 4 | Ex. 5 | Ex. 6 | Ex. 7 |
|---|---|---|---|---|---|---|---|
| Viscosity Reactant | 26.7 | 16.9 | 13.6 | 10.5 | 5.9 | 2.7 | 1.4 |
| Static Pressure, p.s.i.g | 30 | 30 | 30 | 30 | 30 | 30 | 30 |
| Pressure Range, p.s.i.g | 21–43 | 19–47 | 19–50 | 18–51 | 17–57 | 17–60 | 17–58 |
| Velocity, R.M.S. ft./sec | 1.76 | 2.4 | 2.7 | 2.9 | 3.4 | 3.8 | 3.6 |
| Resonant Frequency, c.p.m | 21.8 | 23.2 | 24.6 | 24.2 | 25.8 | 26.5 | 26.6 |
| Reynolds No., ×10⁻³ | .88 | 1.84 | 2.63 | 3.59 | 7.42 | 17.37 | 30.59 |
| Static Pressure, p.s.i.g | 50 | 50 | 50 | 50 | 50 | 50 | 50 |
| Pressure Range, p.s.i.g | 35–70 | 33–78 | 32–82 | 31–85 | 29–89 | 29–91 | 29–87 |
| R.M.S. Velocity, ft./sec | 2.3 | 3.2 | 3.6 | 4.0 | 4.5 | 4.7 | 4.8 |
| Resonant Frequency, c.p.m | 26.9 | 28.7 | 29.4 | 30.1 | 31.3 | 32.2 | 33.2 |
| Reynolds No., ×10⁻³ | 1.17 | 2.50 | 3.47 | 4.97 | 9.82 | 21.91 | 40.88 |
| Static Pressure, p.s.i.g | 70 | 70 | 70 | 70 | 70 | 70 | 70 |
| Pressure Range, p.s.i.g | 50–97 | 47–109 | 45–112 | 44–117 | 42–120 | 42–123 | 42–120 |
| R.M.S. Velocity, ft./sec | 2.95 | 3.8 | 4.3 | 4.8 | 5.3 | 5.5 | 5.5 |
| Resonant Frequency, c.p.m | 30.6 | 32.9 | 33.5 | 34.1 | 35.8 | 36.6 | 37.5 |
| Reynolds No., ×10⁻³ | 1.43 | 3.00 | 4.19 | 5.90 | 11.56 | 35.18 | 46.81 |

The system was operated at room temperature without a throughput of material. The reactors were filled with the reactant and resonated. The left gas dome had 1530 cc. of gas in it. The right gas dome had 1450 cc. of gas in it. The reactor contained about 160 pounds of solution. The inside diameter of the reactor piping was 1.44 inches. The length of the liquid filled piping was about 197 feet. There were 12 short radius U-bends between the straight sections of piping. The driving pump cylinder contained 215 ml. of liquid. The driving pump displaced about 26.2 cu. in. of material per cycle. Density of reactants; 74.8–65.5#/cu. ft.

It is calculable from the Table I that even under extreme operating conditions, i.e., with reactants of high viscosities, the resonant flow is more than three times the pump flow, and under more favorable conditions, i.e., with reactants of lower viscosities, the resonant flow is more than six times the pump flow. In other words, the flow required to produce turbulence in the reactor was achieved and maintained using a pump not more than one-third the size that would have been required to produce turbulent flow in a reciprocating non-resonating system.

The imposition of a throughput flow has a relatively small influence (less than 14%) on the flow and pressure valves in the resonant system under conditions causing maximum disturbance. The following Tables II and III give some examples of the relative magnitudes of the flow rates in the reactor resulting from the resonation of a system, the throughput, and the pump displacement.

*Table II*

RELATION BETWEEN THROUGHPUT FLOW AND DRIVING PUMP DISPLACEMENT

| Throughput, lbs./hr. | Pump Displacement Rate, lbs./hr. | Throughput as Percent of Pump Disp. |
|---|---|---|
| 10 | [1] 1,470 | 0.7 |
| 50 | [1] 1,470 | 3.4 |
| 100 | [1] 1,470 | 6.8 |
| 200 | [1] 1,470 | 13.6 |
| 10 | [2] 2,230 | 0.5 |
| 50 | [2] 2,230 | 2.3 |
| 100 | [2] 2,230 | 4.5 |
| 200 | [2] 2,230 | 9.0 |

[1] Minimum for system in Table I.
[2] Maximum for Table I.

*Table III*

RELATIVE MAGNITUDE OF RESONANT FLOW AND THROUGHPUT FLOW

| Throughput, lbs./hr. | Flow Rate in Reactor from Resonation, lbs./hr. | Throughput as Percentage of Resonating Flow, Percent |
|---|---|---|
| (At Ve=1.76 ft./sec.) | | |
| 10 | [1] 4,830 | 0.2 |
| 50 | [1] 4,830 | 1.0 |
| 100 | [1] 4,830 | 2.1 |
| 200 | [1] 4,830 | 4.1 |
| (At Ve=5.5 ft./sec.) | | |
| 10 | [2] 13,200 | 0.1 |
| 50 | [2] 13,200 | .4 |
| 100 | [2] 13,200 | .8 |
| 200 | [2] 13,200 | 1.5 |

[1] Minimum velocity in system from Table I at max. density.
[2] Maximum velocity in Table I at min. density.

The influence of the throughput on the system will be the percentages given in Tables II and III only under conditions chosen to make the disturbance a maximum. The disturbance can essentially be eliminated by adjusting the frequency of the feed and discharge pumps to that of the oscillatory flow and synchronizing them with the activating pump (the feed and discharge pumps, in such instances, being positive displacement piston type pumps or others with similar discharge patterns).

The use of a continuous type of feed and discharge pump could be used in some cases where disturbance of the resonating flow is not limited to more than about half the percentages in Tables II and III.

The reactor apparatus, and method of operation involved, according to this invention, allows the separation of throughput flow from flow velocity. That is, the velocity of the reaction liquid in the reactor pipe or tube T, although reciprocating, is practically independent of the throughput flow. This is of considerable advantage in cases where long retention time of the reaction liquid within the reactor pipe or tube is required to attain the desired reaction of the liqud components. The reacton liquid can be kept in turbulence even though throughput alone would give streamline flow. Furthermore, continual cyclic reversal of flow, without interfering with progressive throughput flow, is of advantage in that it prevents unidirectional buildup in the reactor pipe or tube T of gel particles or the like, especially in the neighborhood of obstructions which may be present. The oscillatory movement imposed upon the progressively flowing reaction liquid stream also tends to break up incipient bridging of gel particles or the like, and aids in cleaning of the reactor pipe or tube after use.

The gas used to pressurize the gas domes A and B can be any gas which does not dissolve in the reaction liquid to an appreciable extent, and which does not react with said liquid.

Figure 2:
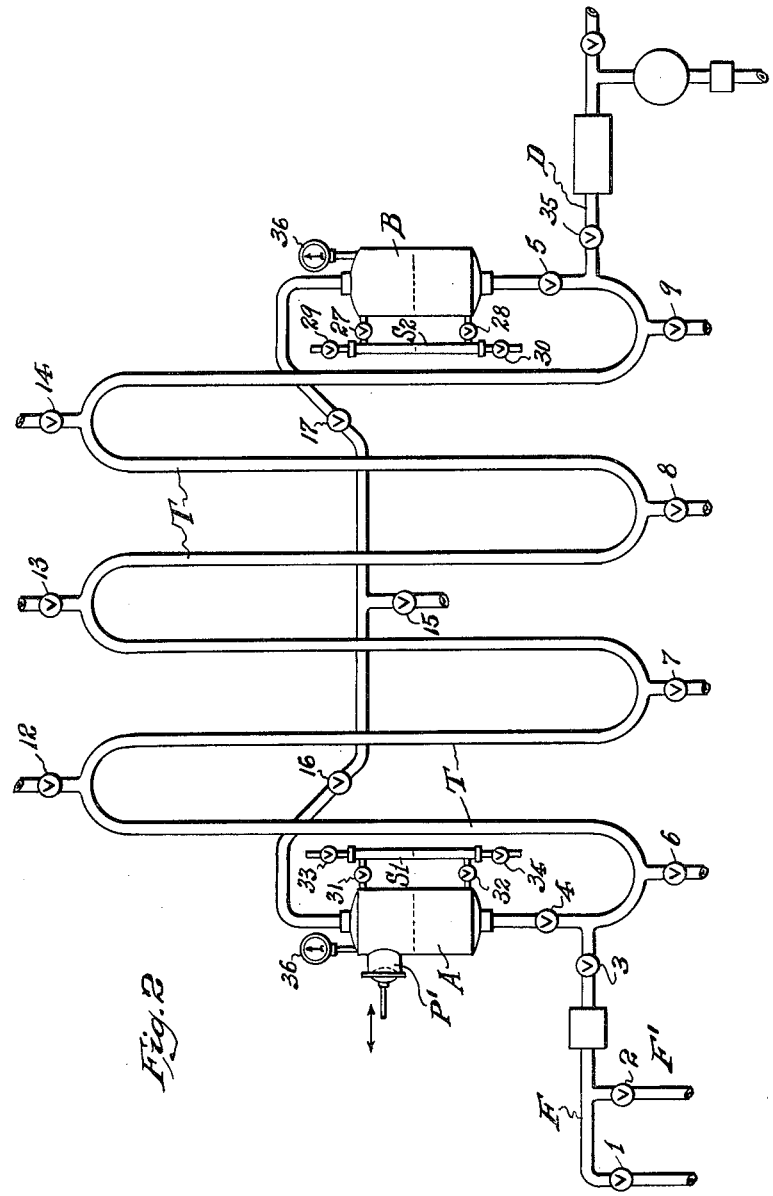
FIG. 2 is a schematic showing of another and modified example of tubular reactor apparatus embodying the principles of this invention.

Referring now to FIG. 2, this view schematically illustrates a modified and somewhat simplified form of resonating pulse reactor embodying the principles and method of operation according to this invention. In this form of the resonating pulse reactor, a pulse generating device acts directly upon the gas content of one of the potential energy storing devices, e.g., the gas dome A, and takes the place of the reciprocating pump P and the associated conduit legs C1 and C2 of the first above described reactor apparatus shown by FIG. 1. In other respects, said modified form of reactor is the same as that first above described, and included corresponding parts thereof are indicated by the same identifying reference characters as applied to said first above described reactor.

The pulse generating device of said modified form of reactor may comprise a piston pump or a diaphragm pump, being schematically indicated as of the latter type, and being identified by the reference character $P^1$. When said modified form of reactor is operating in equilibrium, the oscillating movement of the reaction liquid in the reactor pipe or tube T is also substantially produced by the pressure differential across the gas domes A and B, and the pulse generating pump $P^1$ operates to apply a periodic pulse impact, which is transmitted through the gas content of the gas dome A to the reaction liquid, whereby to maintain the oscillating movement of the latter in harmony with the natural resonance of the progressive advance thereof in throughput flow through the reactor pipe or tube T.

It may be pointed out that the potential energy storing devices employed in the reactor of this invention may comprehend various specific forms other than the gas domes hereinabove referred to. For example diaphragms of flexible material impervious to the reaction liquid, and balanced against internal pressure at each end of the reactor pipe or tube T by gas or spring pressure; bellows, either gas inflated or spring loaded, located at each end of the reactor pipe or tube T; vertical pipe legs at each end of the reactor pipe or tube T, in which the liquid-gas interface may rise and fall, so that the liquid leg differential serves as the energy storing reservoir; elastic wall tube sections respectively connected with the ends of the reactor pipe or tube T, the tension of which effects the pressure differential across the ends of the reactor pipe or tube, and, in this case, the resiliency of the tube sections may be supplemented by pressurizing the external surfaces of their elastic walls; or elastic wall tube sections having closed ends and respectively contained within end portions of the reactor pipe or tube T, said tube sections containing a compressible content, such as air or other gas or a resilient compressible solid such as silicone rubber.

It will also be understood that the pulse generating device may also comprehend various forms other than piston or diaphragm pumps hereinbefore referred to. For example, the same may comprise bellows operated by an air motor; or a rocking device containing a movable portion of the reactor pipe or tube connected with the stationary portions of the latter by flexible joints, and so arranged that the direction of oscillating motion of said movable section is aligned with the flow path of the reaction liquid through the reactor pipe or tube.

The following examples are illustrative of polymerization reactions which can be conducted in a resonating reactor designed as described herein.

*Example I.*—This example describes the preparation of a phenol-formaldehyde condensation product, a so called "novolak" or two-step phenolic resin. When phenol and formaldehyde are reacted in the presence of an acid catalyst there is engendered a two phase system, a resin phase and an aqueous phase. Attempts to carry out such a reaction in a tube reactor without resonating resulted in phase separation, a difficultly controllable reaction and gel formation to the extent that the system was completely blocked and inoperative after twenty-four hours, after startup. However, when conducted in a resonating reactor as described below the reaction proceeded for 244 hours before being voluntarily terminated. At this time examination showed that fouling was limited to a thin film of resin on the walls of the reactor which did not interfere noticeably with the performance of the reactor.

PRODUCTION OF SOLID TWO-STEP PHENOL FORMALDEHYDE RESIN

Feed compositions:
Formaldehyde, 37% aqueous solution
 parts by weight__ 69.3
Phenol _____do____ 100.0
Oxalic acid _____do____ 0.18
Reactor comprised 390 ft. of 1.44" I.D. tubing.

Reaction and operating conditions:
Reactor temperature, °C. _____ 128
Feed rate, lb./hr. _____ 280
Static pressure, p.s.i.g. _____ 110
Pressure range during operation, p.s.i.g. ____ 80–140
Resonant frequency, c.p.m. _____ 27
Product rate, lbs./hr. _____ [1] 175
Continuous operation for 244 hours.

[1] Material devolatilized in auxilliary equipment. Product rate based on devolatilized material.

*Example II.*—This example describes the preparation of a phenol formaldehyde resin using an alkaline catalyst, a so-called "resole" or one-step phenolic resin. This is a single phase reaction system and when the reaction was conducted in a tube reactor without resonating there was a progressive build-up of gelled resin on the tube surfaces until the tube section at the outlet end was completely closed and the system was inoperative after 24 hours of reaction time. A series of similar reactions conducted in a resonating reactor as described below proceeded without appreciable resin gel build-up, until voluntarily terminated at the end of 112 hours.

Feed compositions   Parts by weight
 Formaldehyde, 37% aqueous sol'n _____ 192–197
 Phenol _____ 100
 Sodium hydroxide _____ 3
Reactor comprised 197 ft. of 1.44 I.D. tubing.

REACTION AND OPERATING CONDITIONS

|  | I | II | III | IV | V |
|---|---|---|---|---|---|
| Reaction Temperature, °C. | 60 | 60 | 80 | 80 | 80 |
| Feed Rate, lb./hr. | 34.0 | 21.8 | 118.5 | 81.0 | 72.0 |
| Static Pressure, p.s.i.g. | 100 | 100 | 100 | 100 | 100 |
| Press. Range during Operation, p.s.i.g. | 61–148 | 70–149 | 68–140 | 68–145 | 73–137 |
| Resonant Frequency, c.p.m. | 36 | 36 | 37 | 37 | 34 |
| Product Rate, lb./hr. | [1] 18.2 | [1] 12.4 | [1] 70.1 | [1] 45.4 | [1] 39.6 |

[1] Material devolatilized in auxilliary equipment. Product rate based on devolatilized material.

Having now described our invention, we claim:

1. A reactor system comprising a tube through which a reaction liquid may be caused to pass in continuous progressive flow from feed to discharge ends thereof, a branch at the feed end of said tube through which said liquid may be supplied to said tube, a branch at the discharge end of said tube through which the reacted liquid may be withdrawn, another branch at said feed end, a first potential energy storing device connected to said other feed end branch, another branch at said discharge end, a second potential energy storing device connected to said other discharge end branch, and pulse generating means connected to at least one of said storing devices, whereby an oscillatory flow component larger than the pulses from said generating means, may be produced within the tube at approximately the natural resonant frequency of the system formed by the energy storing devices and reaction liquid.

2. A reactor system according to claim 1, wherein the potential energy storing devices comprise gas domes, the gas contents of which are respectively in elastic pressure contact with opposite ends of the body of reaction liquid intermediate said gas domes.

3. A reactor system according to claim 1, wherein the potential energy storing devices comprise gas domes, the gas contents of which are respectively in elastic pressure contact with opposite ends of the body of reaction liquid intermediate said gas domes, and the pulse generating means is adapted to exert impact upon said body of reaction liquid through the gas content of at least one of said gas domes.

4. A reactor system comprising a tube through which a reaction liquid may be caused to pass in continuous progressive flow from feed to discharge ends thereof, a branch at the feed end of said tube through which said liquid may be supplied to said tube, a branch at the discharge end of said tube through which the reacted liquid may be withdrawn, another branch at said feed end, a first potential energy storing device connected to said other feed end branch, another branch at said discharge end, a second potential energy storing device connected to said other discharge end branch, and pulse generating means connected to impress periodic impulses in opposite directions upon said storing devices, whereby an oscillatory flow component larger than the pulses from said generating means, may be produced within the tube at approximately the natural resonant frequency of the system formed by the energy storing devices and reaction liquid.

5. A reactor system according to claim 4, wherein the potential energy storing devices comprise gas domes, the gas contents of which are respectively in elastic pressure contact with opposite ends of the body of reaction liquid intermediate said gas domes.

6. A reactor system according to claim 5, wherein the pulse generating means comprises a reciprocating pump adapted to exert impacts upon the body of reaction liquid intermediate the gas domes, alternately in opposite directions through the gas contents of said domes.

References Cited in the file of this patent
UNITED STATES PATENTS

| 57,412 | Weyde | Aug. 21, 1866 |
| 1,708,782 | Beale et al. | Apr. 9, 1929 |
| 2,265,762 | McKittrick et al. | Dec. 9, 1941 |
| 2,293,840 | Lignian | Aug. 25, 1942 |
| 2,693,944 | Fowle | Nov. 9, 1954 |
| 2,681,013 | Ogdon | June 15, 1954 |

OTHER REFERENCES

H.P.M. Catalogue 115A1, pp. 1, 7 and 8; Class 103 Sub 223; High Pressure Hydraulic Accumulators, Catalog of the Hydraulic Press Manufacturing Co., Columbus, Mount Gilead, Ohio.